United States Patent [19]

Farmer et al.

[11] Patent Number: 5,343,204
[45] Date of Patent: Aug. 30, 1994

[54] AUTO-FOCUSING CORRECTION FOR ROTATIONAL ACCELERATION EFFECTS ON INVERSE SYNTHETIC APERTURE RADAR IMAGES

[75] Inventors: Michael E. Farmer, Eagan; John D. Hatlestad, Burnsville, both of Minn.

[73] Assignee: Unisys Corporation, Blue Bell, Pa.

[21] Appl. No.: 98,917

[22] Filed: Jul. 29, 1993

[51] Int. Cl.⁵ ............................................. G01S 13/90
[52] U.S. Cl. ................................. 342/25; 342/195
[58] Field of Search ........................ 342/25, 195, 196

[56] References Cited

U.S. PATENT DOCUMENTS

| | | | |
|---|---|---|---|
| H. 910 | 4/1991 | Hindenach | 342/25 |
| H. 955 | 8/1991 | Waters | 342/108 |
| 4,462,032 | 7/1984 | Martin | 343/5 |
| 4,471,357 | 9/1984 | Wu et al. | 343/5 |
| 4,546,355 | 10/1985 | Boles | 343/17 |
| 4,616,227 | 10/1986 | Homma et al. | 342/25 |
| 4,768,156 | 8/1988 | Whitehouse et al. | 364/521 |
| 4,780,718 | 10/1988 | Hudson et al. | 342/25 |
| 4,786,906 | 11/1988 | Krogager | 342/25 |
| 4,851,848 | 7/1989 | Wehner | 342/25 |
| 4,855,747 | 8/1989 | Steinberg | 342/179 |
| 4,924,229 | 5/1990 | Eichel et al. | 342/25 |
| 4,965,582 | 10/1990 | Hellsten | 342/25 |
| 4,975,704 | 12/1990 | Gabriel et al. | 342/25 |
| 4,985,704 | 1/1991 | Smith | 342/25 |
| 5,043,734 | 8/1991 | Niho | 342/25 |
| 5,059,966 | 10/1991 | Fujisaka et al. | 342/25 |
| 5,061,931 | 10/1991 | Farina et al. | 342/25 |
| 5,122,803 | 6/1992 | Stann et al. | 342/25 |
| 5,160,931 | 11/1992 | Brown | 342/25 |
| 5,166,688 | 11/1992 | Moreira | 342/25 |
| 5,184,133 | 2/1993 | Tsao | 342/25 |
| 5,185,608 | 2/1993 | Pozgay | 342/17 |
| 5,237,329 | 8/1993 | Bamler et al. | 342/25 |
| 5,250,952 | 10/1993 | Roth | 342/25 |

OTHER PUBLICATIONS

Ausherman, D. A., et al., "Developments in Radar Imaging," IEEE Transactions on Aerospace & Electronic Systems, vol. AES-20, No. 4, Jul. 1984, pp. 363-398.
Chen, C., "Target-Motion-Induced Radar Imaging," IEEE Transactions on Aerospace & Electronic Systems, vol. AES 16, No. 1, Jan. 1980, pp. 2-14.
Prickett M., "Principles of Inverse Synthetic Aperture Radar (ISAR) Imaging," IEEE, 1980, pp. 340-345.

Primary Examiner—Mark Hellner
Attorney, Agent, or Firm—Glenn W. Bowen; Mark T. Starr

[57] ABSTRACT

Inverse synthetic aperture radar imaging systems that are used to image targets that undergo rotational accelerations are enhanced by signal processing techniques which provide correction factors to reduce the frequency-shift and frequency-stretch errors that occur due to such accelerations. A target scan is subdivided into a number of sub-apertures and a Fast Fourier Transfer (FFT) is performed on the data for each sub-aperture to provide associated frequency sub-images. The FFT is then subdivided in "sub-swaths" of amplitude versus frequency for a plurality of frequency bands. The change-of-frequency, or frequency shift, data between prominent scattering points of each sub-image are processed to provide a phase correction factor that incorporates range changes and translational acceleration distortions for additional scattering points other than the most prominent scattering point. A frequency-stretch correction factor that compensates for rotational acceleration distortion is also provided.

12 Claims, 10 Drawing Sheets

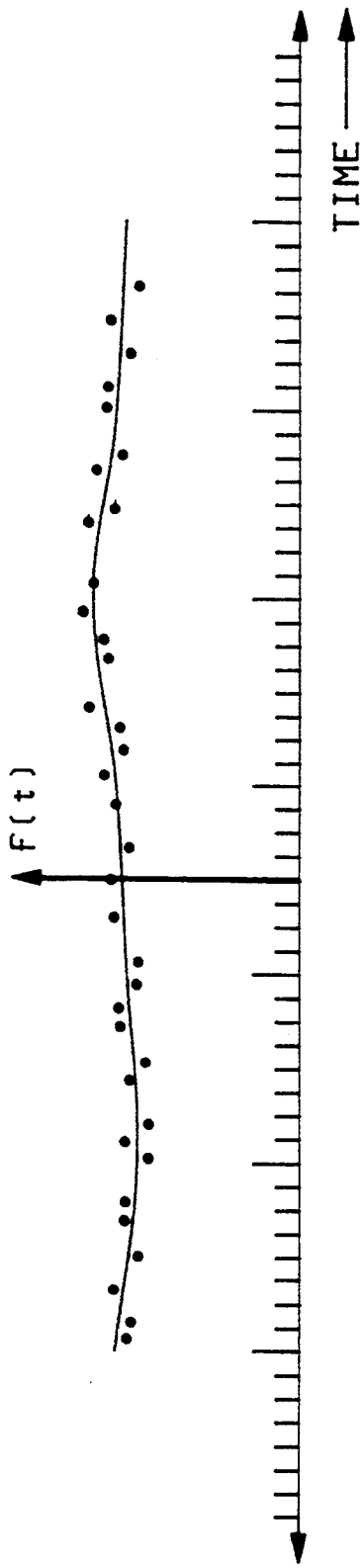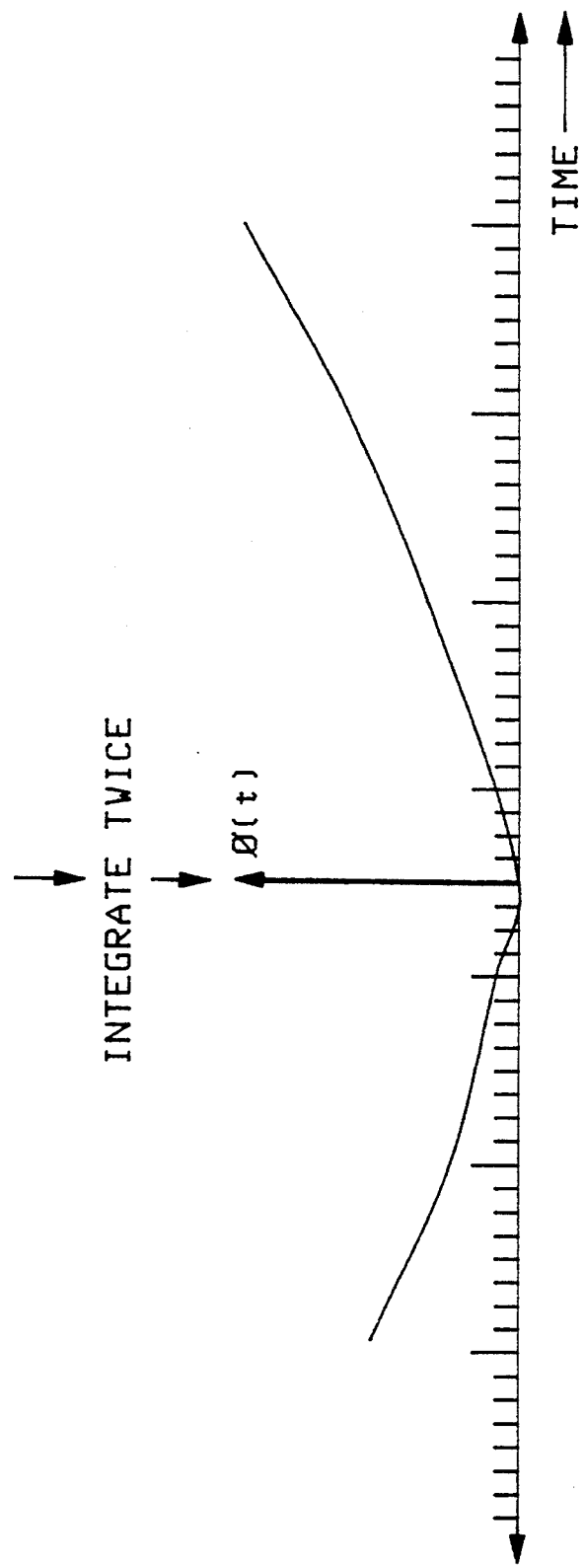

AUTO-FOCUSING CORRECTION FOR ROTATIONAL ACCELERATION EFFECTS ON INVERSE SYNTHETIC APERTURE RADAR IMAGES

BACKGROUND OF THE INVENTION

1. Field of the Invention

The present invention relates to creation of inverse synthetic aperture radar (ISAR) images, and in particular to an enhanced auto-focusing technique for ISAR imaging.

2. Background of the Development of SAR/ISAR Imaging

Doppler-frequency radar has been used to produce map images since the early 1950's. The earliest Doppler radar imaging system did not provide phase correction to compensate for changing Doppler frequencies due to relative motion between the radar platform and the target. Such a system is said to be "unfocused."

Synthetic aperture radar (SAR) systems evolved from this early Doppler frequency analysis mapping. In SAR systems the relative motion between the radar platform and the target area can produce an apparent rotation rate of the target. For example, if an aircraft is over a strip of terrain, prominent features of the terrain will produce variations in the returned signal. The most prominent features of the target that provide radar return signals that are used for mapping are called "scatterers."

The Doppler frequency signal produced by a scatterer is a function of time as the aircraft traverses the terrain strip. A train of coded pulses is transmitted by the Doppler radar. SAR cross-range resolution (i.e., resolution perpendicular to the line-of-sight from the platform to the scatters) is much finer than is attainable from the radar's beam width. Motion induced frequency changes are corrected by determining a phase-shift factor that is applied to modify stored phase information of the return signals. Such correction is called "focusing" the synthetic aperture.

SAR systems are best suited to applications where there is no target motion since target motion may seriously degrade SAR images. Inverse synthetic aperture radar (ISAR) was developed to produce Doppler radar images of moving targets. With ISAR, images of scatterers on the target are resolved in the range direction by use of large bandwidth waveforms and in the cross-range direction by integration of the return signals. ISAR imaging has been proposed to form images of targets which have no appreciable translational motion relative to the transmitting radar but which may be yawing, pitching or rolling, such as a ship at sea.

Ideally, for ISAR imaging, the radar and the target should have no relative translational motion. Then, as the target rotates, scatterers on the target will provide a Doppler frequency which is dependent upon the distance of a scatterer from the center of rotation of the target, the angular rate of rotation of the target, the transmitted wavelength and the angle between the line-of-sight to the target center of rotation and a line that joins the scatterer and the center of rotation. Thus, the same scatterer at various points of the rotation will provide a return signal of a varying Doppler frequency.

Cross-range resolution is dependent upon how well the frequency difference between the various scatterers can be resolved. In ISAR imaging the relative motion of the target is usually uncontrollable. Therefore, the signal processor system associated with the radar has to estimate the target translation and rotation with respect to the radar platform to make the necessary corrections for adequate resolution of the image. The ISAR process maps a three-dimensional target into a two-dimensional image which depends upon the target's rotational motions.

In a conventional strip-map mode SAR, range resolution is achieved through accurate time delay measurements which are obtained by transmitting frequency-dispersed pulses and applying pulse compression techniques to the returned pulses. This is described on page 379 of an article entitled "Developments in Radar Imaging" by Dale Ausherman, et al., in the *IEEE Transactions on Aerospace and Electronic Systems*, Vol. AES-20 No. 4, July 1984. A more sophisticated multiple sub-patch processing technique is described on pages 384–385 of the same article, especially with reference (on pages 385 and 387) to FIGS. 22 and FIGS. 27, respectively.

In this system an image swath is divided into a number of image sub-patches which break up the images into small areas which are sequentially illuminated by the radar antenna as the platform moves past the target. Motion of each of these sub-patches is compensated for relative to their respective centers to provide a reference function which changes on a pulse-by-pulse basis according to pulse-by-pulse range changes. The signal from each of these sub-patches is then sent to bandpass filters which filter the signal into a number of frequency sub-bands. Frequency sub-bands are provided which correspond to N range sub-swaths across M bandpass filters. Each of these N sub-swaths are partitioned into M sub-bands which correspond to the multiple sub-patches in the cross-range direction. The data within each channel is two-dimensionally Fourier-transformed to produce the sub-patch images which are then combined to form a full-scan image.

U.S. Pat. No. 4,546,355, issued Oct. 8, 1985, entitled "Range/Azimuth/Elevation Ship Imaging for Ordinance Control" issued to Sol Boles, describes a method of processing Doppler interferrometric azimuth and elevation angle information obtained from the reflection or radar signals from scatterers on a ship which are combined into a weighted multi-variant regression fit using digital signal processing techniques. These techniques provide measures of ship translational and rotational motions for focused high resolution imagery. The patent also describes the capability of scaling a cross-range Doppler dimension of ISAR profiles. The "scaled" or "stretched" ISAR images which have their ordinate values derived directly from Doppler representation rather than values derived from elevation angle measurements are also discussed in column 9 of this patent. A Fast Fourier Transform digital waveform produces Doppler resolved coherently integrated vector sums which are used for range/Doppler map generation and range/azimuth map generation.

United States Statutory Invention Registration H955, published Aug. 6, 1991 in the name of William M. Walters, describes an ISAR imaging technique which utilizes a primary antenna, and an auxiliary antenna to estimate aircraft altitude rate.

United States Statutory Invention Registration H910 published Apr. 2, 1991, entitled "Adaptive Two-Dimensional Shading for Batch Synthetic Aperture Using Phased Radar Antenna" published in the name of Lawrence J. Hindenach, describes a SAR processing system in which a number of sample points in the frequency range domain, for which the gain estimation is to be made, are selected. These are divided into a plurality of sample points and overlapping groups. Transformation is then made from frequency range domain to antenna coordinates.

U.S. Pat. 4,855,747, issued Aug. 8, 1989, entitled "Method of Target Imaging and Identification" which issued in the name of Bernard D. Steinberg, describes the technique of combining ISAR imaging with adaptive beam-forming.

U.S. Pat. 4,616,227, issued Oct. 7, 1986 in the name of Koichi Honma, et al., entitled "Method of Reconstructing Synthetic Aperture Radar Image" describes a method of re-sampling position designation data from Doppler rate-times-change data and re-sampling the image, after range compression in the azimuth direction, using the azimuth coordinates and transformation data in order to keep unaltered the Doppler rate of a point image relating to the image after record transformation.

Prior SAR and ISAR Imaging Error Correction Techniques

When a platform carrying a Doppler radar and using ISAR imaging processing moves relative to a target, such as a ship in a heavy sea, the line of sight angle between the platform, which may be an airplane, and the ship will change as the airplane first approaches and then recedes from the ship. There are several sources of errors which occur during ISAR imaging. One such source of error is termed the quadratic phase error which occurs because the angle between the path of the plane and the target point varies as the range between the plane and the target ship changes.

With reference to FIG. 1, for example, at range R1, the angle between the flight path and the path of the radar beam is $\Theta 1$, whereas at range R2, when the plane is closer to the target ship, the line of sight angle is 2, where the angle $\Theta 2$ is larger than the angle $\Theta 1$. This change in the line-of-sight angle results in blurring of the ISAR imaging due to slight variations over the integration interval. It is the primary source of error that also occurs in the traditional SAR imaging of terrain. This type of error is well understood and is removed from SAR and ISAR images by using traditional auto-focus techniques which are well known to those engaged in the arts of SAR and ISAR. In SAR as well as in ISAR systems, a continuous pulse train is sent from the platform to the target, and the returning wave signals are sampled on a constant time difference basis, and correction is made in the quadratic phase errors that are caused by range variations. This correction is made by using time-delay processing techniques which normalize the distance between the Doppler frequency platform and the target.

SAR imaging was initially used for ground-mapping and to provide images of stationary targets. It was later realized that the same Doppler radar principles could be applied to imaging of moving targets. Of course, this introduced more complications and additional errors which must be corrected in order to obtain satisfactory images. Higher order phase errors occur when there is relative acceleration between the platforms, such as an airplane and a target ship where target ship accelerations are created by the heave, surge and sway wave action of the ocean, as illustrated in FIG. 2.

The type of errors that have been previously corrected in ISAR systems have been those which occur when the acceleration of the target is relatively constant over a sampling period of time. Phase errors caused by relatively constant accelerations have been removed from ISAR signals in the past by use of multiple sub-aperture processing in which the radar data obtained for each sub-aperture is processed by an FFT algorithm or device to provide amplitude versus frequency sub-images, each of which corresponds to a sub-aperture, which is used for error correction processing.

ISAR, prior to the disclosed invention, was not totally satisfactory, however, for providing imaging of moving targets and in particular for imaging surface ships at sea, even when the range-dependent quadratic phase errors and the higher order acceleration phase errors had been compensated by the above-described prior techniques because of pitch and roll rotational acceleration variations caused by waves.

FIG. 5a shows a ship with a rolling action that is in a position where it is rotating at a maximum rotation rate and, therefore, has a zero rotational acceleration. FIG. 5b shows the same ship at the end of the roll cycle where the ship's rotational velocity is zero and the rotational acceleration is a maximum. The type of error created by such rotation where the rotational acceleration rate varies is a frequency-dependent error. Prior art ISAR image correction algorithms have assumed that the ship is undergoing rotation at an approximately constant rate of rotation so that the pulses, which are sampled at constant time-difference intervals, correspond to a constant angular-difference sampling. In actuality, the rotation rate of the ship will vary over the time used for image formation so that a correction is necessary to obtain constant angular-difference samples from the constant time-difference pulses.

ISAR signals caused by time-varying rotation are not only time-dependent, but they also are frequency-dependent. Prior correction techniques do not remove these rotational artifacts from ISAR images, and this substantially limits the quality of ISAR images of ships at sea and of other targets or applications that require high resolution imaging of targets that are capable of undergoing rotational acceleration, particularly variable rotational acceleration.

SUMMARY OF THE INVENTION

Improvement of an inverse synthetic aperture radar image is obtained by enhancing the image data that is utilized to form the image when a target that is undergoing rotational acceleration may also be undergoing range change and translational acceleration so that range change, translational acceleration and rotational acceleration distortion components that result from the relative target motion may be present in the image data.

Radar return image signals are sampled at a number of initially equal time intervals to provide digital sub-image data that are representative of the radar return image signals. Sub-aperture digital data storage areas, known as sub-apertures, are formed into which digital sub-image data are collected over an entire scanned image. A frequency spectrum is then computed for each sub-aperture, preferably using a Fast Fourier Transformation, to produce sub-image magnitude versus frequency data plot using stored data in each sub-aperture. The frequency spectrum of each sub-image is subdivided into a plurality of magnitude versus frequency plots of sub-swaths which collectively span the sub-image.

The change-of-frequency data for each sub-swath between selected sub-aperture times are estimated and stored. A change-of-frequency versus frequency-data-plot is generated for all of the selected sub-swaths for each selected pair of sub-aperture times. Data are collected at a number of mid-point times of a selected sub-aperture pair. The change-of-frequency versus frequency-data-plots is then curve-fitted to form substantially linear data plot curves which are each associated with one of the mid-point times. The change-of-frequency intercept value is measured for each of the data plot curves with the change-of-frequency axis of said change-of-frequency versus frequency-data-plot as is the slope value of each of the data plot curves. A polynomial is then fitted to the frequency intercept values versus time and another polynomial is fitted to the slope values versus time.

Focusing is then provided by twice integrating the intercept polynomials and slope polynomials with respect to time and replacing the radar return image signals with image signals that have range change and translational acceleration distortion components eliminated. This is achieved by utilizing the values obtained from the twice-integrated change of frequency intercept values versus time data plots to develop phase correction signals for the radar return image signal. Rotational acceleration distortion components are next eliminated by utilizing the values obtained from the twice-integrated slope versus time data plot to modify said initial equal sampling time intervals in order to compensate for frequency-stretch errors. Frequency shift data obtained from the various peaks of the radar return signal may be weighted with relative amplitude data to obtain a combined correction factor that is dependent on both amplitude and frequency shift.

BRIEF DESCRIPTION OF THE DRAWINGS

The present invention and background art are described with reference to the drawings in which:

FIG. 3b is a diagram of radar scan as a function of frequency which shows how the Fast Fourier Transformed (FFT) sub-images that are derived from Fourier Transformed data may be associated with each of the sub-apertures of FIG. 3a;

FIG. 4b is a plot of amplitude versus frequency for a sub-aperture image that is obtained from the radar scan of FIG. 3a for a sub-aperture image that is associated with a translational acceleration relative to the sub-aperture image of FIG. 4a;

FIG. 4c is a plot view of a radar scan as a function of frequency that is associated with rotational acceleration relative to the sub-aperture image of FIG. 4a;

FIG. 7a is a plot of the change of Doppler frequency versus time data that is obtained from the intercept points of FIG. 9;

FIG. 7b is a plot of the phase correction factor versus time curve that is obtained by double integration of the plot of FIG. 7a with respect to time;

DETAILED DESCRIPTION OF THE INVENTION

The present invention is concerned with the elimination of the time-dependent and frequency-dependent errors that occur due to rotational acceleration of a target relative to a platform that carries a Doppler radar. It is implemented by using images that are divided into a number of sub-images and by double integration of change-of-frequency versus time data that is obtained to provide phase-correction information. However, unlike prior ISAR imaging systems, the derived correction information corrects both for the constant acceleration errors and for rotational errors.

In addition to this phase-correction information, "time-warping," or resampling data, provides a correction factor that is related to the frequency stretching of the FFT that occurs when rotational acceleration of the target is present. The combination of this new modified phase-correction factor and the new time-stretch-correction factor enables correction of the effects of both translational acceleration and the rotational acceleration components to be made from the same FFT processed sub-image and does not require the separate derivation of FFT images.

Figure 1:
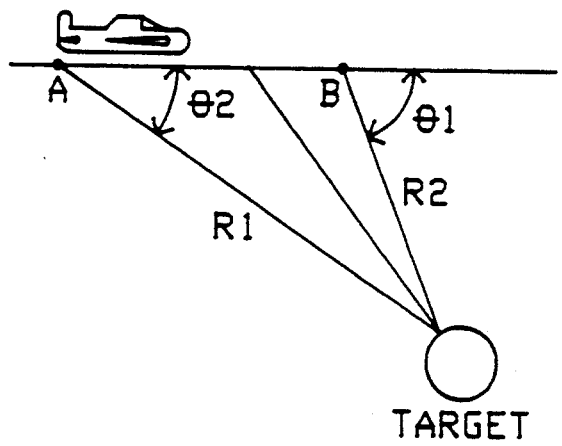
FIG. 1 is a diagram that illustrates how a radar-carrying airplane that moves relative to a target creates a quadratic phase error.
Figure 2:
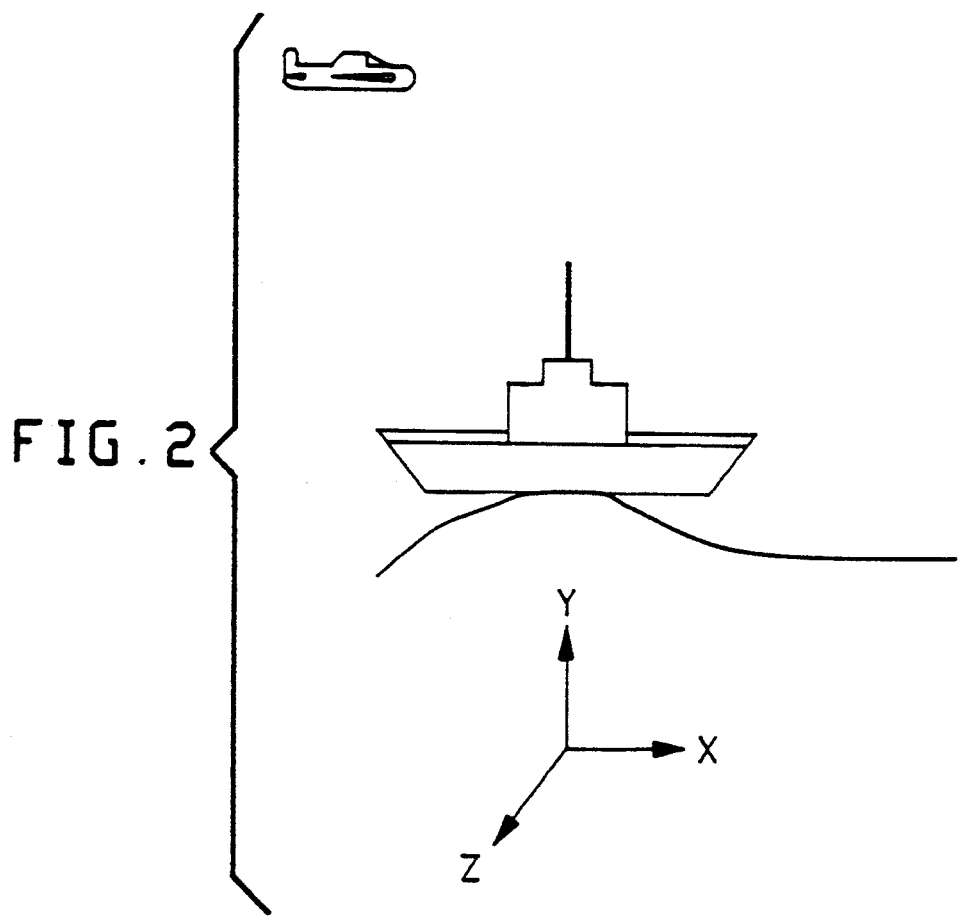
FIG. 2 is a diagram that illustrates the independent acceleration axes of a radar-carrying plane and a target ship that is subject to sea heave, surge and sway.
Figure 3A:
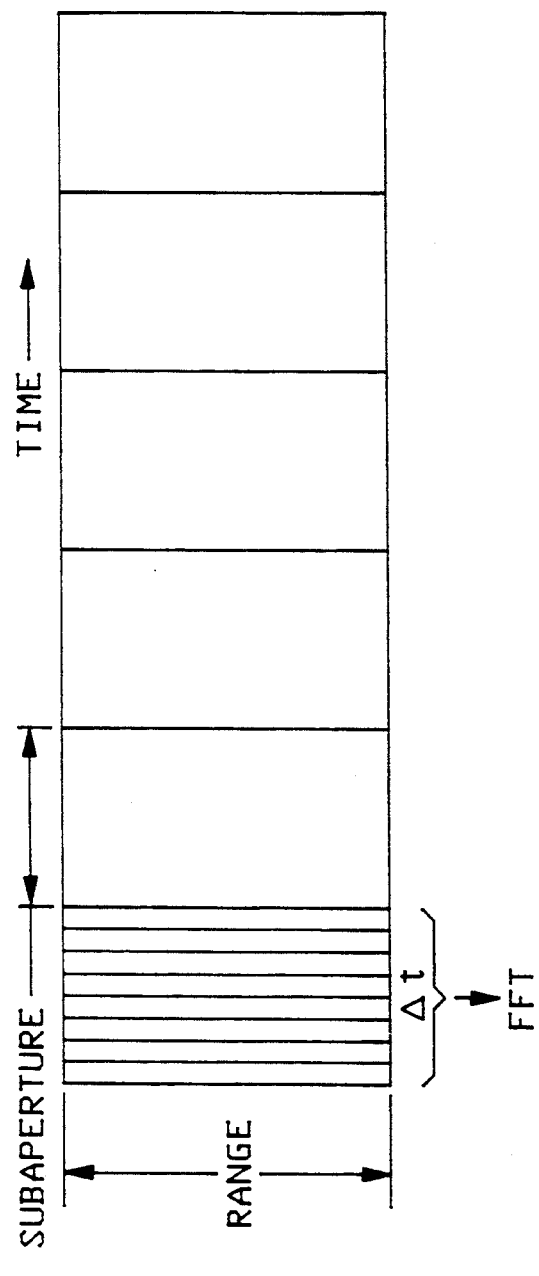
FIG. 3a is a diagram of a radar return scan as a function time which shows how the radar data obtained along ISO-range, or constant-range, lines are divided into sub-apertures.
Figure 3B:
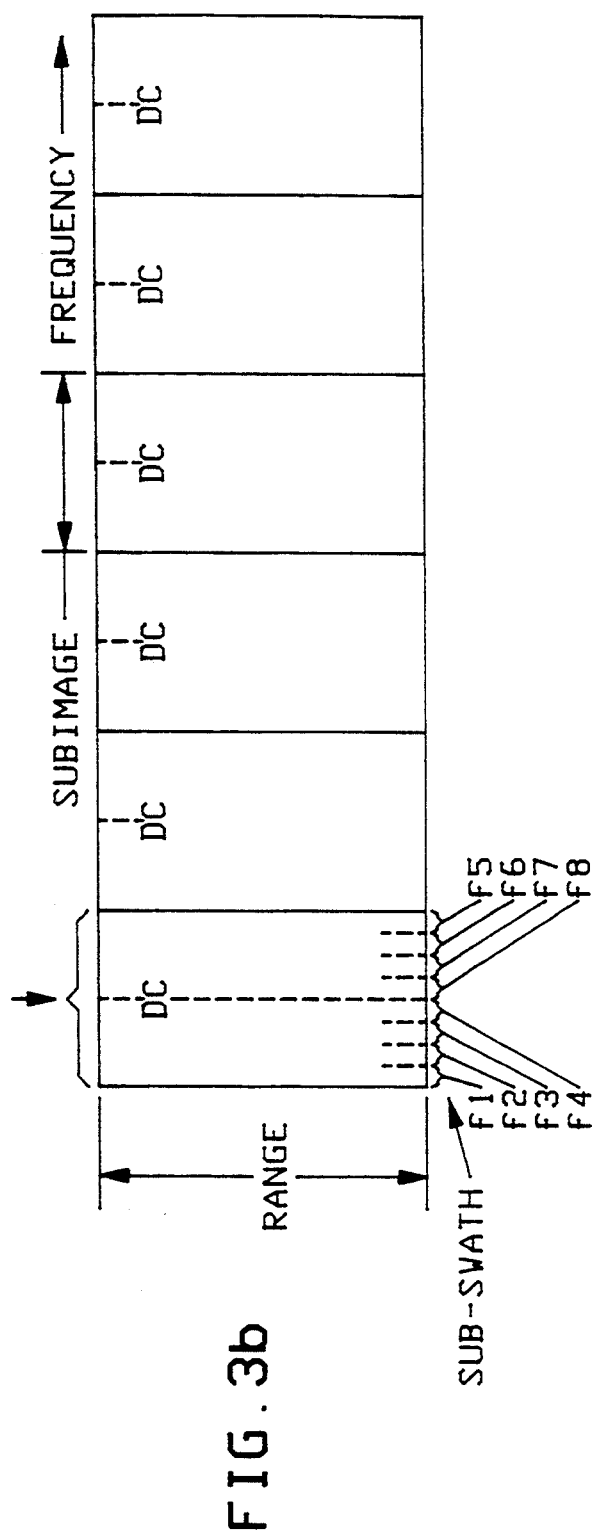

FIG. 3a is a diagrammatic view that illustrates how target scans corresponding to a single image have been divided into multiple sub-apertures from t1 to t7 to provide ISAR sub-images, as a function of time, as the Doppler radar scans along ISO-range lines of a defined extent. Amplitude and phase data of the return signals are thus obtained by sampling the returned signals at a constant rate over the entire image. The data from each sub-aperture is sampled at intervals, as shown in FIG. 3a, and the sampled data over the sub-aperture is used to provide Fast Fourier Transform sub-images in correspondence with each of the sub-apertures of FIG. 3a. The sub-image information is then divided into frequency sub-swaths of substantially equal bandwidth, as shown in FIG. 3b. From FIG. 3b it is seen that each sub-image preferably has the same range of frequency values in the sub-swaths f1, f2, f3, etc., and that the D.C. frequency position is fixed in each sub-image.

Image scatterers in a target will cause large amplitude peaks to be provided in amplitude versus frequency plots for sub-images where the return signal is substantially affected by the scatterer, as shown. Data from each sub-aperture is processed by known Fast Fourier Transform (FFT) signal processing algorithms or devices. This FFT can be used to provide amplitude versus frequency images of the type shown in FIG. 4a. The frequency range of the FFT for the representative sub-image is from the negative Doppler frequency extreme to the positive Doppler frequency extreme. Centered between these frequency extremes in the FFT plot is the zero, or D.C., frequency marker.

Figure 4A:
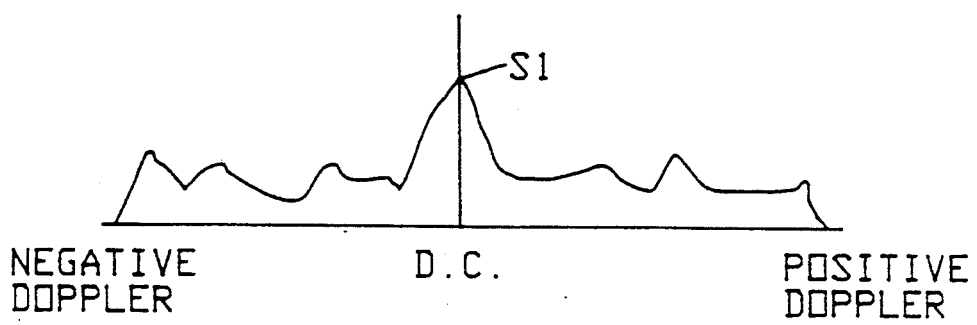
FIG. 4a is a plot of amplitude versus frequency for a representative sub-aperture image that is obtained from the radar scan of FIG. 3a at a particular sample time.
Figure 4B:
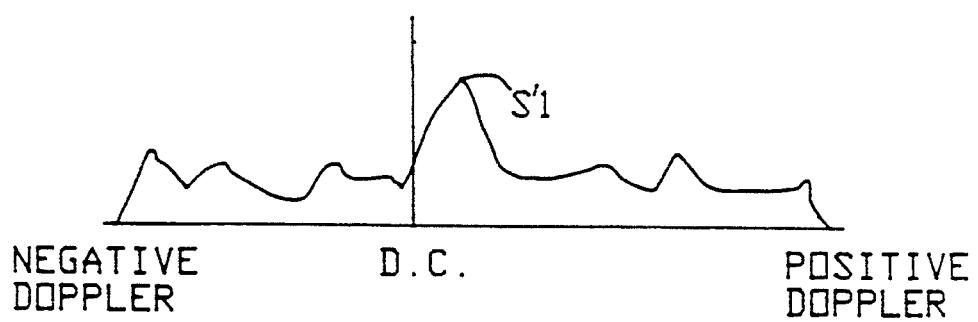

Information was also collected for consecutive sub-images, each of which represented a sub-aperture scan. If there was any relative translational acceleration of the target between the images, the peak, or highest, amplitude signal point, such as the signal point S1 of FIG. 4a, shifted to a new position, such as S'1 in FIG. 4b. In the illustrated example the point S1 peak for the image of FIG. 4a is shown as being at the DC or the zero frequency point, but it could be at any other frequency point in the plot. Constant line-of-sight acceleration or deceleration can cause aperture peaks to shift in either a positive frequency or a negative frequency direction relative to the DC point, as shown in FIG. 4b.

Frequency sub-swath processing based on the entire duration of a data collection is known in which cooperation is provided so that the nominal center range of frequencies of each sub-swath exhibits zero frequency and phase over the integration, as disclosed in the aforementioned Auscherman et al article.

Figure 4C:
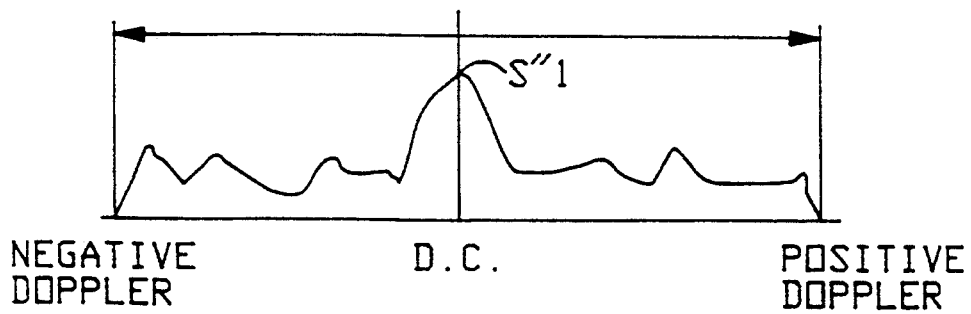
Figure 5A:
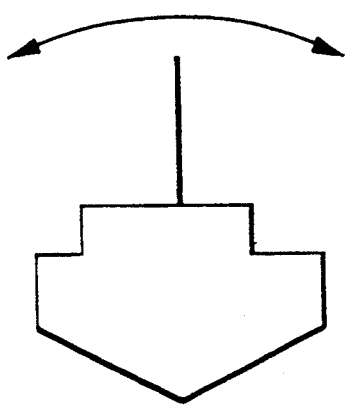
FIG. 5a is a diagrammatic showing a rotating ship at the point where it has reached a maximum rotation rate and thus has zero rotational acceleration.
Figure 5B:
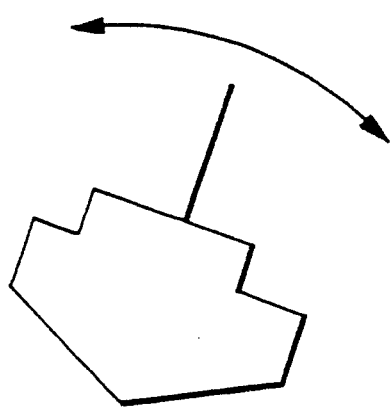
FIG. 5b is a diagrammatic showing of a rotating ship at the point where it has reached the end of the roll cycle and thus has a maximum rotational acceleration.

Frequency stretching and occurs in FFT plots that are derived from the ISAR imaging signals that are received from a rotating ship, as shown in FIG. 4c. The frequency image of FIG. 4c has been stretched or expanded by the rotational acceleration of the target so that the negative frequency extreme of FIG. 4c is more negative than the negative frequency extreme FIG. 4a, and the positive frequency extreme of FIG. 4c is more positive than the positive frequency extreme of FIG. 4a, or, in other words, the frequency range is compressed, as shown in FIG. 4c.

Figure 6:
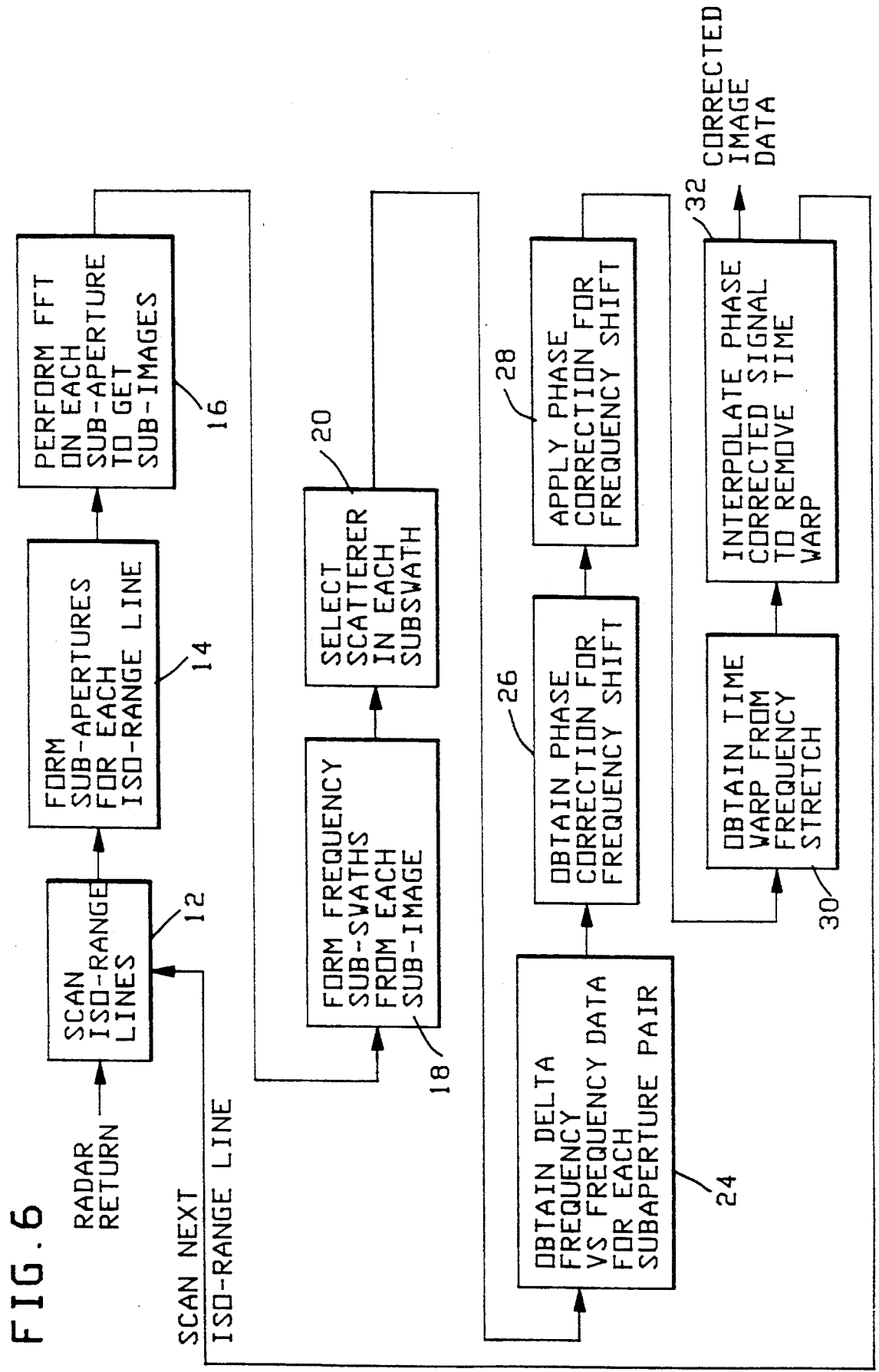
FIG. 6 is a block diagram representation of the imaging error correction technique of the present invention.

FIG. 6 shows the process 10 whereby improved signal processing of ISAR images is accomplished. ISAR Doppler frequency radar return data are scanned in step 12 in ISO-range lines to form apertures that are subdivided into sub-apertures in step 14. These sub-apertures are formed by sampling data at regular intervals shorter than the overall time interval for an aperture. A Fast Fourier Transformation (FFT) is then used at step 16 to obtain a sub-image for each sub-aperture. In the prior art, the frequency shift information was derived from FFT images each of which corresponded to a sub-aperture since it was assumed to be independent of frequency. This frequency shift data was then used to correct the phase errors due to translational acceleration, but errors due to rotational acceleration were ignored.

In the present invention instead of assuming that the frequency shift is the same at every frequency (i.e., that the target rotation rate, or range migrated rate, is nearly constant), as in the prior art, step 18 is employed so that amplitude versus frequency information for each of the sub-image plots is broken up into frequency sub-swaths, each of which represent a different frequency band of a limited extent. For example, the first sub-swath, as shown in FIG. 3b, could be a range of frequencies from f1 to f2, the second from f2 to f3, the third from f3 to DC, the fourth from DC to f4, the fifth from f4 to f5, the sixth from f5 to f6 and the seventh from f6 to f7, where DC is halfway between f1 and f7 for the sub-aperture image of FIG. 4a. The FFT plot of consecutive sub-swaths is then used to generate both rotational and translational acceleration correction factors that are based on sub-image FFT data.

Figure 8A:
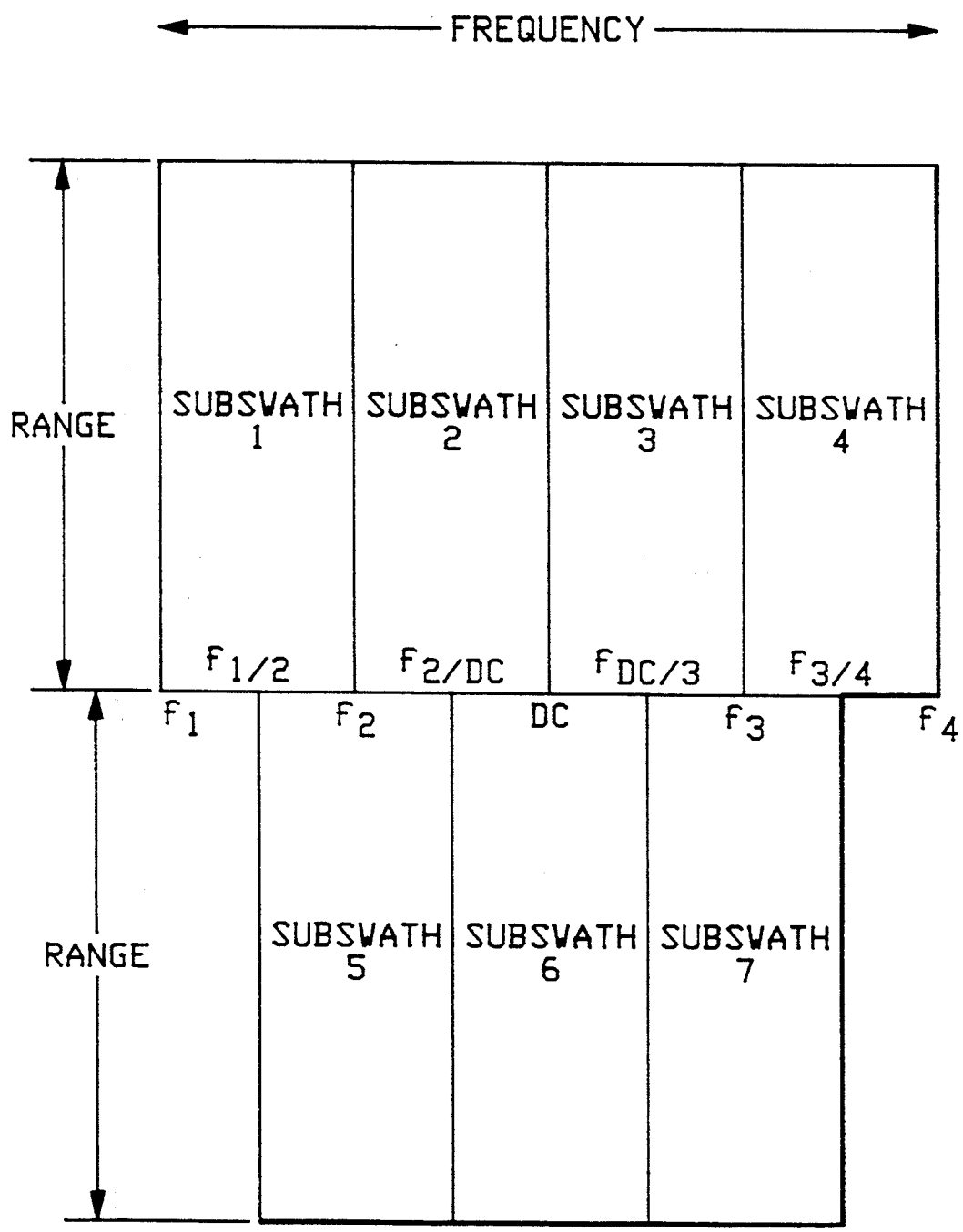
FIG. 8a is a diagram that shows how overlapping sub-swaths may be formed for the described embodiment for use in the process of FIG. 6.

In order to further improve the correction performance, it may be desirable to further divide the FFT plot frequency band into overlapping sub-swaths which are displayed in FIG. 8a. For example, if four sub-swaths ranging in frequency from f1 to f4 formed a swath, sub-swaths five, six and seven could be added. The fifth sub-swath overlaps the upper frequencies of the first sub-swath and the lower frequencies of the second sub-swath with the value such that f1/2 is the average of the frequency values f1 and f2, and f2/DC is the average of the frequency values f2 and DC on "zero" frequency at the middle of the sixth sub-swath. Correspondingly, the sixth sub-swath has frequency limits f2/DC and fDC/3. The seventh sub-swath has frequency limits of fDC/3 and f3/4 which is the reverse of f3 and f4. The range of frequencies for each sub-swath are preferably substantially equal.

Figure 8B:
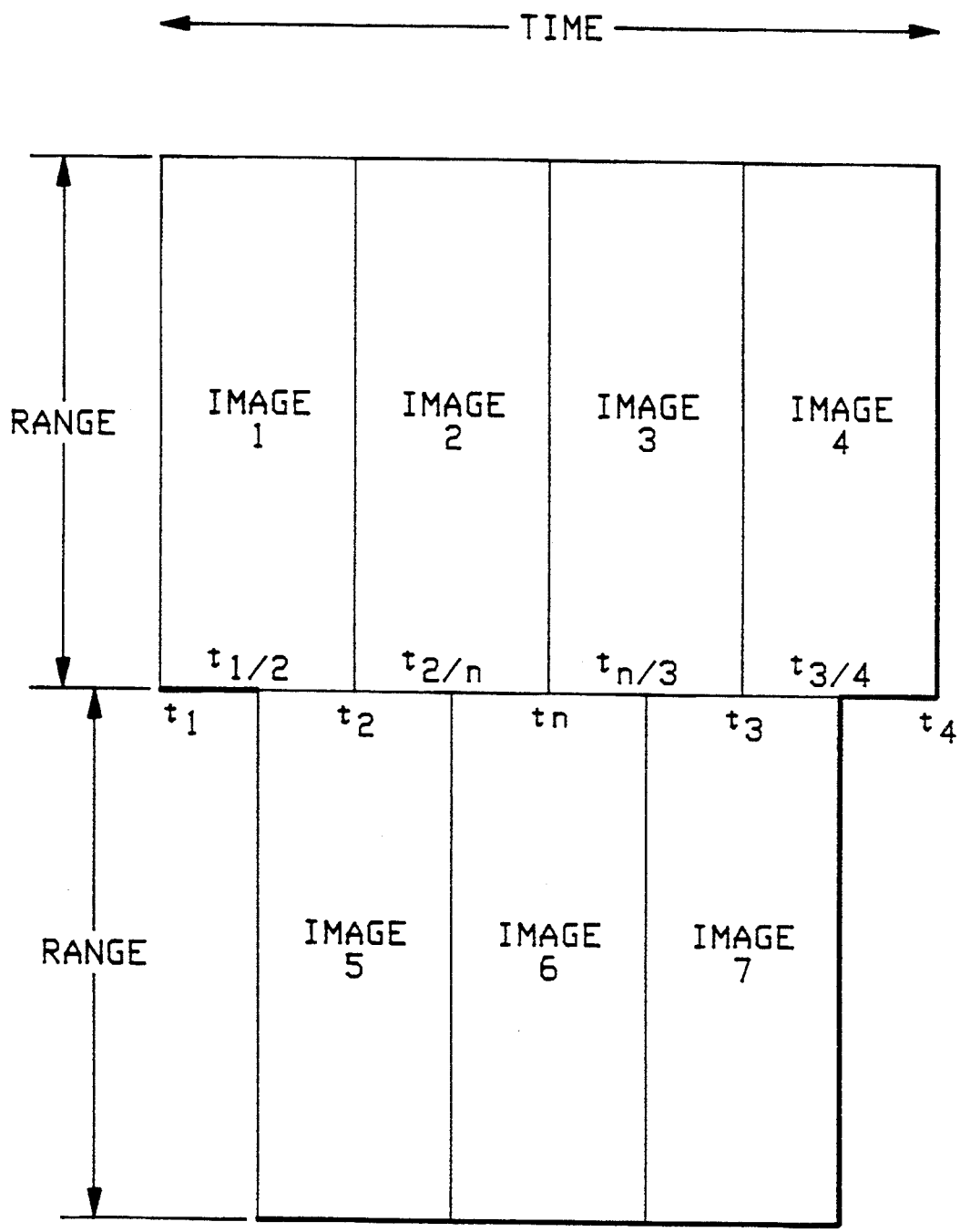
FIG. 8b is a diagram that shows how overlapping sub-apertures may be formed for the described embodiment for use in the process of FIG. 6.

With either non-overlapping sub-swaths or the overlapping sub-swaths mentioned above, frequency shift estimation is performed in a manner similar to that previously employed to remove constant translational acceleration. However, in the prior art frequency shift estimation was performed on an image-to-image basis, while with the procedure of the present invention, a frequency-shift estimation is performed for each frequency sub-swath. Such estimation may be accomplished by known cross-correlation signal processing techniques, or by tracking the most prominent scatterers in each sub-swath. Overlapping sub-apertures similar to the sub-swaths of FIG. 8a, as shown in FIG. 8b, may also be utilized where the relationships between the sub-apertures 1–4 and the overlapping sub-apertures 5–7 are the same as described for FIG. 8a, except the overlap occurs on a time basis. For example, sub-aperture 5 extends in time from t1/2 to t2/n where t1/2 is the average of t1 and t2, and t2/n is the average of t2 and tn is the average of t1 and t4. Overlapping sub-apertures or sub-swaths may be used independently or in combination, as desired.

In the present invention, it is preferred to measure frequency-shift based on discrete scattering peaks so that relative amplitudes of the peaks may be considered, or weighed, into the algorithm. Thus, in the preferred showing of FIG. 6, the most prominent scatters in each sub-swath are selected in step 20. Signal-weighting to obtain signals that have values that are dependent on two or more variables is a known technique. Alternate embodiments of the invention may be provided by using standard data cross-correlation techniques that are well known to those in the ISAR and SAR radar arts to obtain a cross-correlated frequency shift for each sub-swath.

Plotted information obtained from the correlation between sub-images appears a frequency shift versus frequency plot, as shown in 9. The small dot, ("."), above the symbol f(t) on the vertical axis means that the function f(t), (frequency as a function of time) is differentiated with respect to time. Thus, f(t) represents the rate of change of frequency from one sub-image to another.

Figure 9:
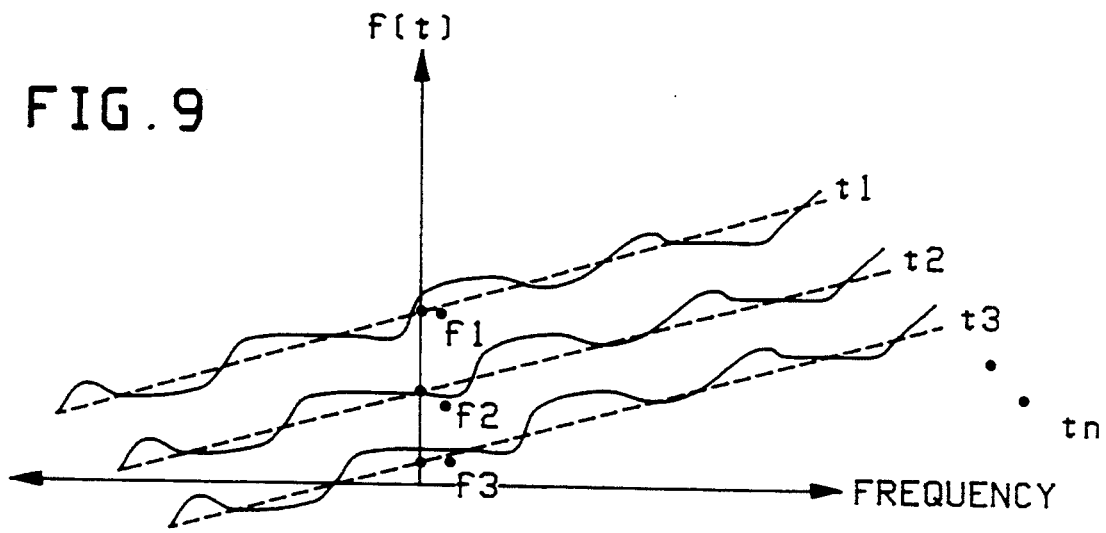
FIG. 9 is a series of snapshot plots of frequency-change versus frequency data where data obtained at the mid-range of sub-swaths of FIG. 8 are used to provide polynomial-fitted curves.

A straight line is fitted to the change of frequency, or delta frequency, versus frequency plot for each pair of consecutive sub-images. As shown in the representative example of FIG. 9, curve-fitting of change of frequency data points obtained at, for example, times t1, t2, t3 for a given scatterer provides lines representative of these scatterers. The example of FIG. 9 shows a series of snapshots that illustrates one set of data conditions that occur when the rotational acceleration of the target ship is relatively constant. In step 24 the change of frequency versus frequency data is obtained for each sub-aperture pair. The frequency changes that correspond to the translational accelerations are determined by intercept, (for example, f1, f2, fr3), with the delta frequency f axis. The slope of each line is representative of the frequency stretch data for each of the sampled times which is a function of rotational acceleration and allows for calculation of correction factors for frequency shift and frequency stretch over each sub-aperture. The rotational acceleration in the specific example of FIG. 9 is assumed to be approximately constant, and thus the slopes of each of the dotted lines in FIG. 9 are approximately the same.

Frequency shift and stretch correction factors are now generated, as signified by steps 26 and 30 of FIG. 6. The curve of FIG. 7a represents the change of frequency intercept versus time plot for each sub-aperture pair that is obtained in step 24 by accumulating the results obtained for each scatterer over the scanned ISO-range line for another representative example. In FIG. 7a the large black dots in the plot represent frequency shift intercept estimates from FIG. 9 at various sub-image update times. Update times are indicated on the time axis of FIG. 7a by the longer vertically extending lines. The shorter vertically extending lines between the sub-image update marks occur at the sampling times between the sub-image update sampling times.

A polynomial curve is then fitted to the data points in FIG. 7a using known techniques. The fitted polynomial is next mathematically integrated, and FIG. 7b is a plot representative of the polynomial data after one integration. The plot of FIG. 7b represents the instantaneous correction frequency versus time. The data of FIG. 7b is again integrated, and a phase correction factor ($\Phi(t)$), as represented by the curve of FIG. 7c, is derived which must be applied to re-construct the phase relationships of the original signal in order to eliminate the signal distortion caused by translational acceleration. The frequency correction factor curve of FIG. 7b is obtained by integrating in step 26, (i.e., by mathematical manipulation of the associated data by known techniques) the polynomial plot of FIG. 7a.

The phase-correction factor of FIG. 7c is utilized in a manner which is analogous to the manner in which the phase correction for an image was used in the past. However, in the present invention, the frequency-shift correction factor that is associated with translational acceleration is a function of the intercept values, such as f1, f2, f3 in FIG. 9. Frequency-shift data that is related to scattering points other than the major scattering point of each image as a result of rotational acceleration are also captured in the present invention. The frequency-shift that is generated by the line-of-sight-target range change or by translational acceleration changes will merely shift the target along the Doppler frequency axis, and may thus be corrected in a manner analogous to the prior techniques. In fitting the polynomials to the frequency shift and frequency stretch curves, data interpolation in the manner of the prior art may also be employed to remove effects of rotational acceleration.

Returning to FIG. 6, in step 26 the phase-correction function is developed by generating a complex exponential from the phase-correction curve and correcting the sub-aperture and scatterer frequency shift information with this signal by techniques to those of ordinary skill in the art. At this point in the processing, the correction factor will have removed frequency shift errors, and the image should be relatively free from blurring at or near the DC value.

Figure 11A:
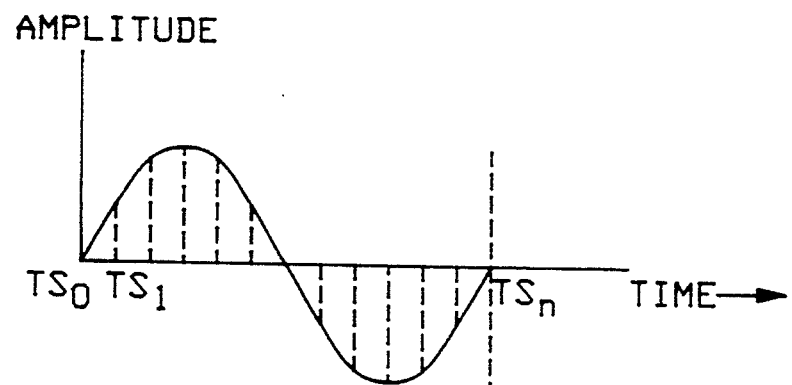
FIG. 11a is a plot of a sampled radar return signal which does not have time-warping correction factors applied to adjust spacing-time of the sample points.
Figure 11B:
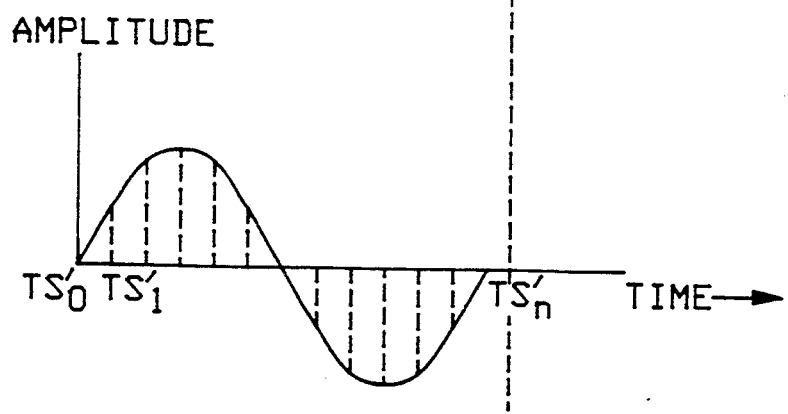
FIG. 11b is a plot of a sampled radar signal which does have time-warping correction factors applied to adjust spacing-time of the sample points.
Figure 10A:
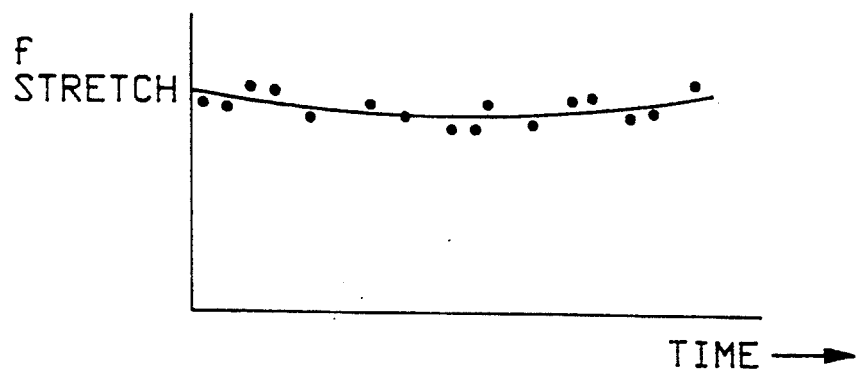
FIG. 10a is a plot of the frequency stretch versus time data that is obtained from the slope values of FIG. 9.

When rotational acceleration occurs, the sampled data of the signal produces an amplitude versus time plot which is "frequency-stretched" which produces a "time-warped" signal. As illustrated in FIG. 11a, the radar return data signal of a target without rotational acceleration is sampled at uniform sampling periods. For example, sampling time TS0 and TS1 and all of the remaining consecutive samples to TS are evenly spaced in time. Any rotational acceleration that occurs, however, will cause a time-warping effect which requires a correction of the sample time spacing of the radar return to compensate for this effect. Just as frequency shift information can be plotted versus time and twice integrated to provide a phase-correction factor for rotational acceleration, so also can the frequency shift information be plotted versus time, as shown in FIG. 10a. Double integration of the data of FIG. 10a in step 30 of FIG. 6 then yields the "W" or time-warp correcting factor, as illustrated in FIG. 10b.

Figure 10B:
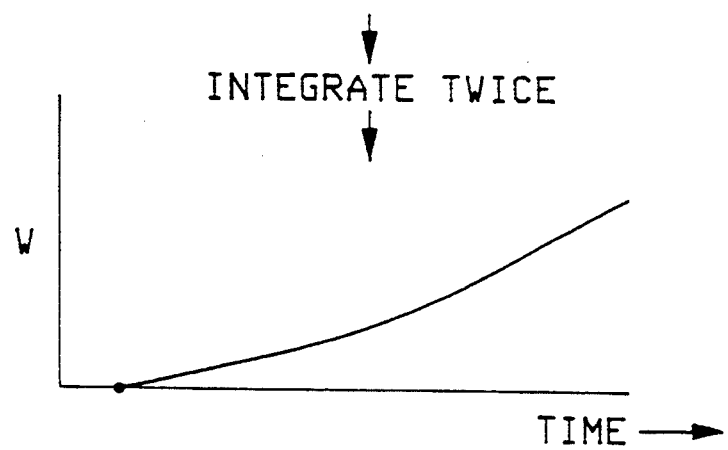
FIG. 10b is a plot of the frequency stretch correction factor versus time curve that is obtained by double integration of the plot of FIG. 10a with respect to time.

In step 32 the time-warp correction factor is used to interpolate the sampling times for each ISO-range line in order to adjust the sampling time spacings so as to reconstruct the signal at time-warped or corrected sampling times other than the original sampling time to compensate for frequency stretch due to rotational acceleration, as shown in FIG. 10b. The image may be sharply focused at all frequencies by adjusting the times to TS'0, TS'1 . . . TS'n to compensate for the frequency-stretch.

It should be noted that even a uniform rotation rate can cause distortions if the total angle from which the target rotates is larger than one or two degrees since the change in the angle to each scatterer over time causes a corresponding change in the Doppler frequency of the return from that scatterer versus time, and that the image of each point scatterer is subject to blur due to rotational acceleration.

We claim:

1. A method for improving an inverse synthetic aperture radar image by enhancing the radar return image signals that are utilized to form an image of a target that is undergoing rotational acceleration and that may also be undergoing range change and translational acceleration so that range change, translational acceleration and rotational acceleration distortion components that result from the relative target motion may be present in said radar return image signals comprising the steps of:

(a) sampling said radar return image signals at a plurality of initially equal time intervals to provide a plurality of digital sub-image data representations of said radar return image signals wherein said sub-images collectively span said image of said target, (b) forming a plurality of sub-aperture digital data storage areas for each of said sub-images into which said digital sub-image data representations are respectively collected over said image of said target, (c) computing a frequency spectrum for each sub-aperture to produce a magnitude versus frequency data plot for each sub-aperture, (d) subdividing said frequency spectrum of each sub-image into a plurality of magnitude versus frequency plots of sub-swaths which collectively span said associated sub-image, (e) estimating and storing change-of-frequency data in each sub-swath between selected pairs of sub-apertures, (f) generating a change-of-frequency versus frequency data plot for all of said selected sub-swaths for each selected pair of sub-apertures, (g) selecting a plurality of times each of which is a mid-point time for a selected sub-aperture pair, (h) curve-fitting said change-of-frequency versus frequency data to form a plurality of data plots which are each associated with one of said mid-point times, (i) measuring the change-of-frequency intercept value for each of said data plots on the change-of frequency axis of said change-of-frequency versus frequency data plot, (j) measuring the slope value of each of said data plots of the change-of-frequency versus frequency data plot, (k) providing a polynomial fitting of the polynomial represented by said intercept values versus scan-time, (l) providing a polynominal fitting of the polynominal representation by said slope values, (m) twice integrating said intercept polynomials and slope polynomials with respect to time, and (n) replacing said radar return image signals with image signals that have:

(1) range change and translational acceleration distortion components eliminated by utilizing the values obtained from the twice-integrated change-of-frequency intercept values versus time data plots to develop phase correction signals for said radar return image signals, and (2) rotational acceleration distortion components eliminated by utilizing the values obtained from the twice-integrated slope values versus time data plot to modify said initial equal sampling time intervals to compensate for frequency-stretch errors of said radar return image signals.

2. A method as claimed in claim 1 comprising the selecting the peak points of said magnitude versus frequency plots in said sub-swaths to provide peak point data which are representative of significant scattering points of said target image according to predefined criteria.

3. A method as claimed in claim 2 comprising the further step of:
weighting said peak-point data of said sub-images as a function of the magnitudes of said peak points.

4. A method as claimed in claim 1 wherein each of said sub-swaths overlap at least one other of said sub-swaths.

5. A method as claimed in claim 4 wherein said sub-swaths are arranged into first and second groups of substantially equal bandwidth sub-swaths and each sub-swath image of said first group is frequency-overlapped by at least one sub-swath of said second group, and each frequency overlap range is approximately equal to one-half of the bandwidth of said sub-swath.

6. A method as claimed in claim 1 wherein there is no time gap between the sub-apertures of at least one sub-aperture pair.

7. A method as claimed in claim 3 wherein each of said sub-swaths overlap at least one other of said sub-swaths.

8. A method as claimed in claim 7 wherein said sub-swaths are arranged into first and second groups of substantially equal bandwidth sub-swaths and each sub-swath image of said first group is frequency-overlapped by at least one sub-swath of said second group, and each frequency overlap range is approximately equal to one-half of the bandwidth of said sub-swath.

9. A method as claimed in claim 8 wherein there is no time gap between the sub-apertures of at least one sub-aperture pair.

10. A method as claimed in claim 9 wherein each of said sub-apertures overlap at least one other of said sub-apertures.

11. A method as claimed in claim 6 wherein each of said sub-apertures overlap at least one other of said sub-apertures.

12. A method as claimed in any of the claims 1–6 or 10–11 wherein said computing step is accomplished by using a Fast Fourier Transformation.

* * * * *